United States Patent [19]

Richardson et al.

[11] Patent Number: 4,999,250
[45] Date of Patent: Mar. 12, 1991

[54] COMPOSITION AND USE

[75] Inventors: Peter J. Richardson, Rochdale; Bernard Tury, Prestwich, both of England

[73] Assignee: Imperial Chemical Industries plc, London, England

[21] Appl. No.: 184,404

[22] Filed: Apr. 20, 1988

[30] Foreign Application Priority Data

Apr. 27, 1987 [GB] United Kingdom ............... 8709896

[51] Int. Cl.$^5$ .................... B32B 15/04; C04B 9/02
[52] U.S. Cl. ................... 428/457; 106/14.12; 106/14.13; 428/469; 428/470
[58] Field of Search ............. 428/457, 465, 458, 469, 428/207, 470; 148/6.15 R, 6.15 Z, 252; 106/14.12, 14.13

[56] References Cited

U.S. PATENT DOCUMENTS

| | | | |
|---|---|---|---|
| 2,518,438 | 8/1950 | Beretvas | 106/267 |
| 4,007,310 | 2/1977 | Miyamoto et al. | 428/207 X |
| 4,304,707 | 12/1981 | Kuehn | 260/37 R |
| 4,525,427 | 6/1985 | Bayha et al. | 428/458 |
| 4,606,967 | 8/1986 | Mosser | 428/469 |
| 4,717,431 | 1/1988 | Knaster et al. | 148/6.15 R |
| 4,719,266 | 1/1988 | Craig | 428/465 X |

FOREIGN PATENT DOCUMENTS 742468 12/1955 United Kingdom .

Primary Examiner—Thomas J. Herbert
Attorney, Agent, or Firm—Cushman, Darby & Cushman

[57] ABSTRACT

A composition which comprises (a) a salt of a metal (M) of a hydroxycarboxylic acid in which the OH and COOH groups are attached to the ring atoms of a fused ring system and (b) a surface coating compound or composition. The metal (M) is at least divalent and may be magnesium, calcium, barium or particularly zinc. The fused ring system is preferably a fused aromatic hydrocarbon ring system such as naphthalene. The OH and COOH groups can be attached to adjacent carbon atoms of fused hydrocarbon ring system. Zinc 3-hydroxy-2-naphthoate has been found to be particularly suitable. The composition may also include a metal oxide and/or a metal phosphate. Component (b) can be a film forming binder system, a natural oil or a grease. The composition can be coated onto the surface of a metal. The coated metal shows improved resistance to corrosion.

19 Claims, No Drawings

COMPOSITION AND USE

The present invention relates to a composition, particularly one which can be coated onto the surface of a metal and more particularly a composition which improves the resistance of a metal to corrosion. Corrosion of a metal may be reduced by coating the metal with an anti-corrosive coating composition, for example by coating iron and steel to reduce rusting. Metal surfaces exposed to weather are particularly vulnerable and require protection.

Compositions which can be used to reduce corrosion are frequently based on film forming polymeric organic polymers, which also contain a mixture of pigments and extender solids, at least one of which is effective in retarding corrosion of the substrate metal. Pigments containing lead, in particular red lead, and hexavalent chromium, for instance zinc potassium chromate, are efficient anti-corrosive pigments and have been widely used with success. However, there is a growing awareness of the toxicity of lead and hexavelent chromium and this has already lead to some replacement of these materials by alternative materials. This trend is expected to accelerate when alternative materials are developed which have performance matching that of lead and hexavalent chromium. Zinc phosphate is considered non-toxic, and is extensively used as an anti-corrosive pigment. However, deficiencies in the performance of zinc phosphate are widely reported, in particular its inability to prevent rust creep from damages in the coating. Although slightly soluble metal salts of organic acids are extensively used as corrosion inhibiting additives in aqueous reservoir systems, surprisingly these materials are not widely used as corrosion inhibiting pigments in surface coating compositions. Pigments recently proposed as corrosion inhibitors in metal coating compositions, particularly for ferrous metals, include magnesium azelate (GB No. 1555468), zinc and lead 5-nitroisophthalates (GB No. 1531093), zinc cyanurate (U.S. Pat. No. 4,329,381) and zinc and lead N-phenylglycinate (DE No. 3306064). Barium salts of hydroxy carboxylic acids such as salicylic acid, have also been proposed (U.S. Pat. No. 4,304,707). However, barium salicylate is soluble in water at a level of greater than 10% w/w, and hence is liable to be leached from a coating containing barium salicylate. Many of the foregoing metal salts are indicated to be very effective, and also to be useful in improving the performance of zinc phosphate when present at low levels.

It will be appreciated that the term pigment implies the insolubility of the material both in the film forming polymer, and also in the solution phase of the composition coated on the metal surface. However, corrosion inhibitors which do dissolve in the polymer and/or the solution phase can still function, and be effective, in limiting underfilm corrosion. Thus it is possible that a corrosion inhibiting pigment could act as such in some coating systems but be soluble in other coating systems and still provide a corrosion inhibiting effect. This is more likely to occur with metal salts of organic acids than with totally inorganic pigments.

We have now found metal salts of hydroxycarboxylic acids which provide useful inhibition of corrosion.

According to the present invention there is provided a composition which comprises (a) a salt of a metal (M) of a hydroxycarboxylic acid in which the hydroxy group and the carboxylic acid group are attached to the ring atoms of a fused ring system and wherein the metal M is at least divalent; and (b) a surface coating compound or composition.

Hereafter the salt of a metal (M) of a hydroxycarboxylic acid in which the hydroxy group and the carboxylic acid group are attached to the ring atoms of a fused ring system will be referred to simply as "the salt".

The fused ring system may be substituted or unsubstituted. Suitable substituents include halogen atoms, hydroxyl groups, hydrocarbyl groups, hydrocarbonoxy groups, hydrocarbonyl groups or hydrocarbonyloxy groups. Any substituent groups which are present in the fused ring system are additional to the hydroxy and carboxylic acid groups. The substituent groups may be such as to modify the solubility characteristics of the salt. Thus, the substituent may be an alkyl, alkenyl, alkoxy or acyl group for example one which contains up to 20 carbon atoms.

The fused ring system contains at least two rings fused together. One or more of the rings may contain a heteroatom, for example a nitrogen atom. Salts in accordance with the present invention are particularly those in which at least one ring of the fused ring system is a hydrocarbon ring. Convenient compounds are those in which the fused ring system is a hydrocarbon ring system, for example a fused aromatic hydrocarbon ring system. The salt is preferably one in which the hydroxy group and the carboxylic acid group are attached to adjacent carbon atoms of the fused ring system, and especially of a fused hydrocarbon ring system. We have obtained useful results when the fused ring system is a naphthalene ring system, as in the salt derived from 3-hydroxy-2-naphthoic acid, 2-hydroxy-1-naphthoic acid or 1-hydroxy-2-naphthoic acid.

The metal (M) is conveniently divalent but metals of higher valency may be used. The salts of monovalent metals are more soluble in water and hence are more liable to be leached from a coating of the composition on a metal surface when this is contacted with water, thus providing an inferior effect. If the composition is one in which (b) is a film forming binder system, the presence of an appreciably soluble material in the film coating is also liable to cause blistering of the film in use. Suitable metals are the metals of Group II of the Periodic Table such as magnesium, calcium, barium and zinc. A trivalent metal which may be used as the metal (M) is aluminium. We have obtained useful results using zinc 3-hydroxy-2-naphthoate.

The compositions of the present invention can be coated onto a metal and we have found that the coated surface has an increased resistance to corrosion. The compositions are suitable for the corrosion inhibition of iron, zinc, copper, tin and aluminium, particularly mild steel and the zinc surface of galvanised steel.

The composition may be an aqueous emulsion or suspension of the salt. Aqueous emulsions or suspensions may be formed in conventional manner using conventional dispersants and surfactants, including nonionic dispersants.

In addition to the salt, the composition also includes component (b) which is a surface coating compound or composition. Component (b) may be a film forming binder system. The film forming binder system which can be used as component (b) of the composition may be a paint (primer), a lacquer; a resin or other protective coating. Thus, the composition may be a solvent-based composition, for example a cellulose/solvent based primer paint such as those used for car "touch up" paints. The salt which is component (a) of the composition is generally insoluble in solvents used for such primers and typically is incorporated as a suspended solid, or pigment, in such a primer paint system. Alternatively, component (b) may be an aqueous emulsion surface coating system, for example a primer or protective coating based on polymer latices such as for example acrylic and styrene/acrylic latices and vinyl acrylic co-polymer latices including acrylate modified vinyl chloride-vinylidene chloride copolymer latices, and the salt which is component (a) may be used as a dispersion or suspension in such aqueous systems. The salt may also for example be incorporated in temporary alkali-removable protective coatings of the addition polymer type in which the polymer contains carboxyl groups.

The film forming binder system which may be used as component (b) of the composition preferably contains an organic polymer and in general any such polymer used in the paint industry may be included in the composition. Thus, the suitable film forming binders include, for example, an alkyd resin, an epoxy resin, an oleoresin, a latex rubber, a chlorinated rubber, a vinyl resin such as polyvinylacetate or polyvinyl butyral, a polyurethane, a polyester, an organic or inorganic silicate, a polyamide or an acrylic polymer. It will be appreciated that the composition can include two or more compatible film forming polymers. The composition may also include an extender or plasticising resin, such as a hydrocarbon resin, or a coal tar derivative.

The film forming binder system which may be used as component (b) of the composition of the present invention can include homopolymers and copolymers of the following:
vinyl chloride,
vinylidene chloride,
vinyl esters of alkanoic acids having from 1 to 18 carbon atoms in the alkyl group, especially vinyl acetate,
alkyl acrylates and methacrylates having from 1 to 18 carbon atoms in the alkyl group,
acrylamide and substituted acrylamides,
acrylonitrile, and methacrylonitrile,
monoethylenically unsaturated hydrocarbons, for example ethylene, isobutene, styrene and alpha-methyl styrene.

Examples of polymers usable when component (b) is a film forming binder system are "acrylic polymers", by which is meant those polymers comprising predominantly units of alkyl acrylates and/or methacrylates having from 1 to 12 carbon atoms in the alkyl group, sometimes containing an acid functionality by virtue of containing polymerised units of one or more aliphatic unsaturated alpha-beta unsaturated carboxylic acids. Polymers of this type are described in European Patent Application Publication No. 0115694.

Other examples of polymers usable when component (b) is a film forming binder system are copolymers of (i) vinyl chloride, (ii) vinylidene chloride and (iii) one or more alkyl acrylates or alkyl methacrylates having from 1 to 12 carbon atoms in the alkyl group; such polymers may optionally also contain polymerised units of one or more aliphatic alpha-beta unsaturated carboxylic acids. Copolymers of this type are described generally and specifically in the specification of UK Patent No. 1558411.

Alkyd containing resins are extensively used as the film forming binder in paint systems and we have obtained useful effects using compositions in which component (b) is a film forming binder system which is or contains an alkyd containing resin, particularly an oil-modified alkyd.

The polymer or polymers, which is, or are, used when component (b) is a film forming binder system, is usually used in an amount of from 5 to 60% (based on the weight in grams of the polymer per 100 $cm^3$ of the composition), and more usually 10 to 40%. The polymer may be dissolved or colloidally dispersed (that is exist as an emulsion, with an average particle size usually below two micrometers) in a suitable liquid carrier medium.

Component (b) may be any material which can be applied to a surface to provide a coating thereon. Thus, component (b) may be a natural oil or grease which has been derived from animals or plants, such as, for example, lanolin or rape seed oil. Alternatively, component (b) may be a petroleum refined product such as a lubricating oil, turbine oil, fuel oil, gasohol or grease, which are used in circumstances in which they contact, and coat, if only temporarily, a metal surface. As discussed in detail previously herein, component (b) may be a film forming binder system.

The composition of the present invention which comprises components (a) and (b), may be coated onto a metal surface to provide a corrosion inhibiting coating. This may be combined with a conventional corrosion inhibition treatment such as, for example, the phosphating of iron. The composition may include, in addition to the salt, other materials, particularly those which have been proposed as corrosion inhibitors. Thus, the composition may include a metal oxide, in particular an oxide of a metal which is the same as the metal (M) which is present in the salt. More particularly, the salt and the metal oxide may be in the form of a basic salt which is conveniently prepared by the reaction of an excess of the oxide of the metal (M) with an appropriate hydroxycarboxylic acid. As an alternative to, or in addition to, a metal oxide, the composition may also include a metal phosphate, particularly a phosphate of the metal (M) which is present in the salt.

Thus, as a further aspect of the present invention there is provided a blend of
(I) a salt of a metal (M) of a hydroxycarboxylic acid in which the hydroxy group and the carboxylic acid group are attached to the ring atoms of a fused ring system and wherein the metal (M) is at least divalent; and
(II) at least one of
  (i) a metal oxide; and
  (ii) a metal phosphate.

A preferred blend in accordance with this further aspect of the present invention contains a salt of the hydroxycarboxylic acid, a metal oxide and a metal phosphate. It is especially preferred that the metal in the salt, the oxide and the phosphate is the same. The metal is very suitably zinc. An example of a blend within the present invention is zinc 3-hydroxy-2-naphthoate, zinc oxide and zinc phosphate, particularly such a blend containing the salt and the oxide in the form of the basic salt.

Blends in accordance with the further aspect of the present invention can be prepared by any suitable mixing technique and, as discussed previously herein, at least some blends may be obtained by the reaction of an excess of the oxide with the hydroxycarboxylic acid. The blends may be performed and the blend may then be incorporated into a composition containing the blend and a film forming binder system. Alternatively, the components of the blend may be added separately to the film forming binder system in order to prepare the composition of the invention.

The composition typically contains from 0.1 to 30% by weight of the salt relative to the total volume of the composition and preferably the salt is present in an amount of 0.1 to 5% w/v. If component (b) of the composition is an emulsion of the film forming binder system in a liquid medium, the salt which is component (a) may give a useful effect when dispersed in the emulsion in an amount of from 0.1 to 15% w/v. If a metal oxide and/or phosphate is also present in the composition, it is preferred that the total of salt plus the metal oxide and/or phosphate does not exceed 70% w/v.

In addition to the metal salt, optionally the metal oxide and/or the metal phosphate, and the surface coating compound or composition, the composition of the present invention may include various other ingredients commonly employed in film forming compositions such as defoamers, rheology control agents, thickeners, dispersing and stabilising agents (usually surfactants), wetting agents, extenders, fungicides, pigments or colourants of one sort or another, coalescing solvents, plasticisers, and anti-freeze agents. Furthermore, as noted previously herein, the composition may also include one or more additional corrosion inhibitors.

The composition of the present invention may be prepared using any of the techniques which have been used for incorporating solids into a liquid or plastic medium in which the solid is essentially insoluble. Thus, if component (b) is a film forming binder system, techniques for preparing paint compositions may be used, for example by mixing the components either in a grinding apparatus or pre-mixing the components and then grinding. The salt, and any optional metal oxide, metal phosphate or other corrosion inhibitor, may be incorporated into the surface coating composition at any convenient stage, for example during the grinding together of the components of the paint formulation.

As noted previously herein, the compositions of the present invention may be coated onto a metal, particularly to provide a corrosion inhibiting coating on the metal.

Thus, as a further aspect of the present invention there is provided a process which comprises coating at least part of a surface of a metal with a composition as hereinbefore defined.

The process of the present invention results in a coated surface which typically has an increased resistance to corrosion and is especially suitable for the corrosion inhibition of iron, zinc, copper, tin, and aluminium, particularly mild steel and the zinc surface of a galvanised steel.

The composition may be applied to the metal surface in conventional manner, for example by dipping, spraying or brushing. The temperature of the application may be any suitable temperature, for example from 0° to 50° C.

The metal surface which is coated with the composition may be brightly polished and/or freshly cleaned, but a lightly rusted surface may be coated by the process of the present invention. Thus the composition may be coated onto a surface in an "as received" condition, and it may be unnecessary for the surface to be freshly cleaned or brightly polished.

The process of the present invention provides a corrosion inhibiting coating on the surface of a metal and may be combined with conventional corrosion inhibition treatments such as the phosphating of iron.

The process of the present invention may be used to provide corrosion inhibition as a pre-treatment before the application of a known surface coating. Thus the coating step may be used, for example, to provide temporary protection whilst the metal is being transferred from one site to another. Hence the process of the present invention may be used for the temporary protection of a metal surface and the protective coating subsequently removed before or during further processing.

A metal surface coated in accordance with the process which is a further feature of the present invention has an improved resistance to corrosion.

Thus, as a yet further feature of the present invention there is provided a metal article, at least part of one surface of which has a coating which is a composition as hereinbefore described and which contains a salt of a metal (M) of a hydroxycarboxylic acid in which the hydroxy group and the carboxylic acid group are attached to the ring atoms of a fused ring system.

The surface of the metal is preferably coated with a composition which contains the salt and a metal oxide and/or a known corrosion inhibitor.

Various aspects of the present invention are set out in more detail hereafter in the following illustrative examples in which all parts and percentages are by weight unless otherwise stated.

Preparation of Barium salt of 3-hydroxy-2-naphthoic acid 78.8 g of barium hydroxide octahydrate, 94 g of 3-hydroxy-2-naphthoic acid, and 190 g water were heated at 80°–90° C. for one hour. The resulting slurry was filtered and the solid dried at 50° C. to yield 122 g of solid, analysing as $C_{22}H_{14}O_6Ba$.

Preparation of Zinc salt of N-phenylglycine 37.5 g of mixed potassium and sodium salts of N-phenylglycine (79.5% free acid) were dissolved in 350 cm$^3$ of water and the pH adjusted to 6.5 with sulphuric acid. A slurry of 8 g zinc oxide in 100 cm$^3$ water was added, and the mixture was stirred for two hours while maintaining the pH at 6.5 with sulphuric acid. The resulting solid was filtered, washed free of sulphate with water, and dried at 50° C. to give 36 g of product, which analysed as $C_{16}H_{16}N_2O_4Zn:0.04ZnO:2H_2O$.

Preparation of Zinc salt of 3-hydroxy-2-naphthoic acid 27.3 g of 3-hydroxy-2-naphthoic acid was stirred at room temperature in 145 cm$^3$ M sodium hydroxide solution plus 50 cm$^3$ water until the bulk of the acid had dissolved.

To the above well stirred suspension was added dropwise a solution of 20.9 g zinc sulphate heptahydrate in about 100 cm$^3$ water. Further aliquots of water were added during the addition to make the mixture more stirrable. When the addition had been completed the mixture was stirred a further one hour, then filtered and the solid product washed well with water and dried at 45° C. to constant weight.

A yield of 32.1 g of a solid having a melting point in excess of 300° C. was obtained.

By micro-analysis, the product was found to contain C 55.6% wt; H 3.9% wt; and Zn 13.5% wt.

Theory for $C_{22}H_{14}O_6Zn \cdot 2H_2O$ is C 55.6% wt; H 3.8% wt; and Zn 13.7% wt.

The proportion of water was determined by Karl Fischer analysis and found to be 7.3% wt. Theory for zinc 3-hydroxy-2-naphthoate dihydrate is 7.6% wt.

EXAMPLES 1 AND 2

Paints with % wt/wt compositions as set out in Table 1, were prepared by shaking together the pigments and extenders (including the various anti-corrosive pigments), white spirit, and about 23% of the binder solution with about 2.5 times of the weight of the other components of 3 mm glass beads. Shaking was effected using a paint conditioner manufactured by the Red Devil Manufacturing Company (Model 5410) for 30 minutes. The resulting mill base was let down with the remaining binder solution as supplied. A solution of driers and anti-skinning agent was then added. The paints had a Pigment Volume concentration of 34–36% (assuming the organic-metal salts to have density 2.5 g.cm$^{-3}$).

TABLE 1

| Component (a) | Comp A (wt) | Ex. 1 (wt) | Ex. 2 (wt) | Comp B (wt) | Comp C (wt) |
| --- | --- | --- | --- | --- | --- |
| LA | 40.1 | 40.1 | 40.1 | 40.1 | 40.1 |
| Talc | 7.6 | 7.6 | 7.6 | 7.6 | 7.6 |
| TiO$_2$ | 7.6 | 7.6 | 7.6 | 7.6 | 7.6 |
| By | 31.7 | 12.4 | 12.4 | 12.4 | 16.5 |
| ZnHN | Nil | 10.7 | Nil | Nil | Nil |
| BaHN | Nil | Nil | 10.7 | Nil | Nil |
| ZnPG | Nil | Nil | Nil | 10.7 | Nil |
| ZnP | Nil | Nil | Nil | Nil | 10.1 |
| DAS | 2.1 | 2.1 | 2.1 | 2.1 | 2.1 |
| WS | 10.9 | 10.9 | 10.9 | 10.9 | 10.9 |

Note to Table 1

(a) LA is a commercially available linoleic modified alkyd, oil length 55%, based on pentaerythritol and supplied as a 50% solution in white spirit. Talc used was Micro-Talc ATI from Norwegian Talc. TiO$_2$ is Tioxide RCR2 from Tioxide Group Ltd. By is micronised grade barytes from Hopton Mining Co. Ltd. ZnHN is zinc 3-hydroxy-2-naphthoate, prepared as described. BaHN is barium 3-hydroxy-2-naphthoate, prepared as described. ZnPG is zinc N-phenylglycinate, prepared as described. ZnP is zinc phosphate PZ40 from Societe Nouvelle des Coulers Zinciques. DAS is a mixture of proprietory solutions to give a solution containing 0.8% cobalt, 10% lead and 1.6% calcium (as naphthenates) and 5.2% methyl ethyl ketoxime. WS is white spirit, which is a mixture of predominantly aliphatic hydrocarbons having boiling range 150–200° C.

A series of paints were prepared by stirring together the paints of Examples 1 and 2 and of Comparative Examples B and C with the paint of Comparative Example A. The resulting paint compositions thus obtained were coated using a draw-down bar onto ground, cold rolled, steel panels, and dried at ambient temperature for two days to give a dry coating thickness of 28±2 micrometers. The panels were scribed according to ASTM 1654 with a vertical line and the scribed panels were exposed for a period of 77 days to a corrosion treatment consisting of alternating periods of two hours exposure to dry air at 35° C. and two hours exposure to a salt mist formed from an aqueous solution containing 0.35 and 0.05 wt. % of ammonium sulphate and sodium chloride respectively at ambient temperature. The exposure was effected in a Mebon Prohesion Cabinet made by C and W Specialist Equipment.

After the foregoing exposure treatment, the coating was stripped from the lower half of each plate. The panels were critically compared for rust creep from the scribe line, filiform corrosion from the scribe and underfilm corrosion. The results obtained are set out in Table 2.

TABLE 2

| Ex. or Comp. | Rust creep (b) (c) | | | Filiform (b) (d) | | | Underfilm Corrosion (b) (e) | | |
| --- | --- | --- | --- | --- | --- | --- | --- | --- | --- |
| Ex. | 3:1 | 1:1 | 1 | 3:1 | 1:1 | 1 | 3:1 | 1:1 | 1 |
| A | — | — | 5 | — | — | C | — | — | D |
| 1 | 3.5 | 2.5 | 2 | B | B | B | B | A | A |
| 2 | 3.5 | 3 | 2.5 | B | B | C | C | B | A |
| B | 3 | 3.5 | 1.5 | B | C | D | D | B | B |
| C | 5 | 6.5 | 6.5 | A | A | A | B | A | A |

Notes to Table 2

(b) 3:1 indicates a mixture of three parts by weight of the paint of Comparative Example A to one part by weight of the paint of the Example or Comparative Example. 1:1 indicates a mixture of equal parts by weight of the paint of Comparative Example A and the paint of the Example or Comparative Example. 1 indicates the paint of the Example or Comparative Example was used alone.
(c) Maximum amount (in mm) of rust creep from the scribe mark, according to DIN 53 167.
(d) A indicates No filiform. B indicates filiform threads <5 mm. C indicates filiform threads 5–15 mm. D indicates filiform threads >15 mm.
(e) A indicates no corrosion, that is <1% of the surface. B indicates slight corrosion, that is 1–10% of the surface. C indicates moderate corrosion, that is 10–20% of the surface. D indicates severe corrosion, that is 20–50% of the surface.

EXAMPLE 3

The procedure of Examples 1 and 2 was repeated to obtain further paint compositions.

The paint compositions were produced using components as set out in Table 3.

TABLE 3

| Component (a) (e) | Comp D (wt) | Ex. 3 (wt) | Comp E (wt) | Comp F (wt) |
| --- | --- | --- | --- | --- |
| LA | 33.8 | 33.8 | 33.8 | 33.8 |
| Talc | 6.4 | 6.4 | 6.4 | 6.4 |
| TiO$_2$ | 6.4 | 6.4 | 6.4 | 6.4 |
| By | 20.6 | 19.9 | 19.9 | 19.9 |
| ZnP | 3.6 | 3.6 | 3.6 | 3.6 |
| ZnHN | Nil | 1.4 | Nil | Nil |
| ZnC | Nil | Nil | 1.4 | Nil |
| BaAS | Nil | Nil | Nil | 0.9 |
| DAS | 1.7 | 1.7 | 1.7 | 1.7 |
| WS | 9.3 | 9.3 | 9.3 | 10.2 |

Notes to Table 3

(a) is as defined in Note to Table 1.
(e) ZnC is a proprietory basic zinc cyanurate (50% zinc) BaAS is a proprietory barium alkylnaphthalene sulphonate supplied in solution in mineral spirit with a barium content of 6.5% wt.

The paints were coated onto steel panels and the coating tested as described in Examples 1 and 2 with the exception that period of exposure was for a total of 170 days. The results obtained are set out in Table 4.

TABLE 4

| Ex. or Comp.Ex. | Rust creep (c) | Filiform (d) | Underfilm corrosion (e) |
| --- | --- | --- | --- |
| D | 10 | B | D |
| 3 | 6 | B | A |
| E | 13 | C | A |
| F | 7 | C | B |

Notes to Table 4

(c), (d) and (e) are as defined in Notes to Table 2.

A further paint was prepared as in Comparative Example D but omitting the zinc phosphate. This paint was coated onto a steel panel and tested as described in Examples 1 and 2. After 98 days of testing, there was heavy corrosion and considerable breakthrough of rust through the paint film.

EXAMPLE 4

Three paints were prepared using the procedure of Examples 1 and 2. One of the paints had the composition as set out in Comparative Example A. A further paint additionally included 1.2% wt. of zinc 3-hydroxy-2-naphthoate. The third paint additionally included 1.2% wt. of zinc salicylate. The paints were coated onto ground mild steel plates, as described in Examples 1 and 2 and dried for 22 days. The coated plates were then tested as described in Examples 1 and 2. Testing was carried out for 37 days. On inspecting the coated plates after the termination of the test, rust breakthrough and underfilm corrosion were substantially less for the plate coated with the paint containing zinc 3-hydroxy-2-naphthoate. The other two paints gave results which were similar to each other but inferior to the paint containing zinc 3-hydroxy-2-naphthoate.

Preparation of Calcium salt of 3-hydroxy-2-naphthoic acid 376 g of 3-hydroxy-2-naphthoic acid (2 moles) were added to about 1.5 dm$^3$ of water, which was maintained at a temperature of 50° C. in a 5 dm$^3$ beaker. The mixture was stirred and a solution of 80 g (2 moles) of sodium hydroxide in one dm$^3$ of water was added in a thin stream giving a colour change from yellow to dark brown.

A solution of 147 g (one mole) of calcium chloride dihydrate in 200 cm$^3$ of water was added to the stirred mixture. On completing the addition, a creamy-beige solid precipitated. The mixture was stirred for three hours at ambient temperature and the solid was then filtered off and throughly washed with water until the filtrate was free from chloride ion. The product was dried to constant weight in an oven at 50° C.

A yield of 380.22 g of a cream colour solid was obtained.

By micro-analysis, the product was found to contain C 56.4% wt; H 4.2% wt; and Ca 8.0% wt.

Theory for $C_{22}H_{14}O_6Ca.3H_2O$ is C 56.4% wt; H 4.3% wt; and Ca 8.5% wt.

The proportion of water was determined by Karl Fischer analysis and found to be 11.4% wt. Theory for calcium 3-hydroxy-2-naphthoate trihydrate is 11.5% wt.

Preparation of Zinc salt of 2-hydroxy-1-naphthoic acid 10.6 g of 2-hydroxy-1-naphthoic acid were stirred with 100 cm$^3$ of water at 50° C. A solution of 2.26 g of sodium hydroxide in 25 cm$^3$ of water was added to the stirred mixture to give a dark brown solution.

3.83 g of zinc chloride was dissolved in 20 cm$^3$ of water and the solution was added to the dark brown solution. A precipitate was formed and was stirred for 30 minutes. The mixture was cooled and filtered. The precipitate was washed thoroughly with water to remove chloride ion. The solid was dried to constant weight in an oven at 50° C.

A yield of 12.53 g of solid was obtained.

By micro-analysis, the product was found to contain C 55.8% wt; H 3.9% wt; and Zn 13.5% wt.

Theory for $C_{22}H_{14}O_6Zn.2H_2O$ is C 55.6% wt; H 3.8% wt; and Zn 13.7% wt.

The proportion of water was determined by Karl Fischer analysis and found to be 7.6% wt. Theory for zinc 2-hydroxy-1-naphthoate dihydrate is 7.6% wt.

Preparation of Zinc salt of 2-naphthoic acid 43 g of 2-naphthoic acid were stirred with 150 cm$^3$ of water at 50° C. A solution of 10 g of sodium hydroxide in 100 cm$^3$ of water was added and essentially all of the 2-naphthoic acid dissolved.

A solution of 17.05 g of zinc chloride in 25 cm$^3$ of water was added and a white precipitate formed. The mixture was filtered and the precipitate washed thoroughly with water to remove chloride ion. The solid was dried to constant weight in an oven at 50° C.

A yield of 54.76 g of solid was obtained.

By micro-analysis, the product was found to contain C 63.2% wt; H 3.7% wt; and Zn 14.7% wt.

Theory for $C_{22}H_{14}O_4Zn.H_2O$ is C 62.1% wt; H 3.8% wt; and Zn 15.3% wt.

The proportion of water was determined by Karl Fischer analysis and found to be 3.9% wt. Theory for zinc 2-naphthoate monohydrate is 4.2% wt.

Preparation of zinc salt of 1-hydroxy-2-naphthoic acid 47 g of 1-hydroxy-2-naphthoic acid were stirred with 150 cm$^3$ of water at 50° C. A solution of 10 g of sodium hydroxide in 100 cm$^3$ of water was added and a dark brown solution was formed.

17.05 g of zinc chloride in 25 cm$^3$ of water were added to the dark brown solution. A precipitate formed. The mixture was stirred for 30 minutes, cooled and filtered. The precipitate was thoroughly washed with water to remove chloride ion and was dried in an oven at 50° C.

A yield of 60.44 g of solid was obtained.

By micro-analysis, the product was found to contain C 52.1% wt; H 4.4% wt; and Zn 12.4% wt.

Theory for $C_{22}H_{14}O_6Zn.4H_2O$ is C 51.7% wt; H 4.3% wt; and Zn 12.7% wt.

The proportion of water was determined by Karl Fischer analysis and found to be 13.9% wt. Theory for zinc 1-hydroxy-2-naphthoate tetrahydrate is 14.1% wt.

Preparation of mixture of Zinc oxide and Zinc salt of 3-hydroxy-2-naphthoic acid 37.6 g (0.2 mole) of 3-hydroxy-2-naphthoic acid were stirred at ambient temperature with 250 cm$^3$ of water to give a suspension of pH 4.8. To the stirred suspension was added 16.2 g (0.2 mole) of zinc oxide. The mixture was stirred for 18 hours to give a suspension of pH 6.8. The mixture was filtered, the precipitate was washed and then dried to constant weight in an oven at 50° C.

A yield of 54.9 g of solid was obtained.

By micro-analysis, the product was found to contain C 47.5% wt; H 3.3% wt; and Zn 23.1% wt.

Theory for $C_{22}H_{14}O_6Zn.2H_2O.ZnO$ is C 47.5% wt; H 3.2% wt; and Zn 23.4% wt.

This material will be referred to hereafter as ZnHN (B1).

The foregoing procedure was repeated using 24.3 g (0.3 mole) of zinc oxide to give a yield of 59.9 g of solid.

By micro-analysis, the product was found to contain C 41.8% wt; H 2.8% wt; and Zn 30.2% wt.

Theory for $C_{22}H_{14}O_6Zn.2H_2O.2ZnO$ is C 41.4% wt; H 2.8% wt; and Zn 30.7% wt.

This material will be referred to hereafter as ZnHN (B2).

The procedure was repeated again, this time using 32.4 g (0.4 mole) of zinc oxide. A yield of 66.3 g of solid was obtained.

By micro-analysis, the product was found to contain C 38.2% wt; H 2.4% wt; and Zn 37.0% wt.

Theory for $C_{22}H_{14}O_6Zn.2H_2O.3ZnO$ is C 36.7% wt; H 2.5% wt; and Zn 36.4% wt.

This material will be referred to hereafter as ZnHN (B3).

The procedure was repeated yet again, this time using 40.5 g (0.5 mole) of zinc oxide. A yield of 74.9 g of solid was obtained.

By micro-analysis, the product was found to contain C 33.9% wt; H 2.3% wt; and Zn 40.8% wt.

Theory for $C_{22}H_{14}O_6Zn.2H_2O.4ZnO$ is C 33.0% wt; H 2.2% wt; and Zn 40.8% wt.

This material will be referred to hereafter as ZnHN (B4).

Preparation of Zinc salt of 6-hydroxy-2-naphthoic acid 37.6 g of 6-hydroxy-2-naphthoic acid were stirred at ambient temperature with 250 cm$^3$ of water and 8.0 g of sodium hydroxide pellets were added. To this mixture was added, whilst continuing to stir, a solution of 13.6 g of zinc chloride in 50 cm$^3$ of water. The mixture was stirred for a further two hours on completing the addition and was then filtered and the precipitate was washed thoroughly to remove chloride ion and was then dried to constant weight in an oven at 50° C.

A yield of 39.6 g of wolid was obtained.

By micro-analysis, the product was found to contain C 57.0% wt; H 3.6% wt; and Zn 13.8% wt.

Theory for $C_{22}H_{14}O_6Zn.H_2O$ is C 57.5% wt; H 3.5% wt; and Zn 14.3% wt.

EXAMPLES 5 TO 9

The procedure of Examples 1 and 2 were repeated to obtain further paint compositions. The compositions of the paints obtained are set out in Table 5.

TABLE 5

| Component (a) (f) | Comp G (wt) | Ex. 5 (wt) | Ex. 6 (wt) | Ex. 7 (wt) | Ex. 8 (wt) | Comp H (wt) |
|---|---|---|---|---|---|---|
| LA | 33.8 | 33.8 | 33.8 | 33.4 | 33.4 | 33.4 |
| Talc | 6.4 | 6.4 | 6.4 | 6.4 | 6.4 | 6.4 |
| TiO$_2$ | 6.4 | 6.4 | 6.4 | 6.4 | 6.4 | 6.4 |
| By | 16.2 | 16.2 | 16.2 | 16.2 | 16.2 | 16.2 |
| ZnP | 7.0 | NIL | NIL | NIL | NIL | NIL |
| ZnHN | NIL | 3.6 | NIL | NIL | NIL | NIL |
| CaHN | NIL | NIL | 3.6 | NIL | NIL | NIL |
| Zn1H | NIL | NIL | NIL | 3.6 | NIL | NIL |
| Zn2H | NIL | NIL | NIL | NIL | 3.6 | NIL |
| Zn2N | NIL | NIL | NIL | NIL | NIL | 3.6 |
| DAS | 1.7 | 1.7 | 1.7 | 1.7 | 1.7 | 1.7 |
| WS | 9.3 | 9.3 | 9.3 | 9.3 | 9.3 | 9.3 |

Notes to Table 5
(a) is as defined in Note to Table 1.
(f) CaHN is calcium 3-hydroxy-2-naphthoate, prepared as described. Zn1H is zinc 1-hydroxy-2-naphthoate, prepared as described. Zn2H is zinc 2-hydroxy-1-naphthoate, prepared as described. Zn2N is zinc 2-naphthoate, prepared as described.

The paints obtained, together with a freshly prepared sample of a material having the composition of Comp.A in Table 1, were coated onto steel panels and the coating tested as described in Examples 1 and 2 with the exception that the period of exposure was 42 days. The results obtained are set out in Table 6.

TABLE 6

| Ex. or Comp. Ex. | Filiform (d) | Underfilm corrosion (h) |
|---|---|---|
| A | A | 7 |
| G | A | 3 |
| 5 | A | 3 |
| 6 | B | 3 |
| 7 | A | 3 |
| 8 | A | 3.5 |
| H | A | 4.5 |

Notes to Table 6
(d) is as defined in Notes to Table 2.
(h) Underfilm corrosion is assessed using the standard charts illustrated on page 205 of "Corrosion Testing Procedures" by F.A.Champion, Second Edition, published by Chapman and Hall, London, 1964. All the corrosion spots were minute as defined in the foregoing Champion reference.

EXAMPLES 9 TO 12

Further paint compositions were obtained using the procedure of Examples 1 and 2. The components used, and the proportions thereof, are set out in Table 7.

TABLE 7

| Component (a) (i) | Ex. 9 (wt) | Ex. 10 (wt) | Ex. 11 (wt) | Ex. 12 (wt) |
|---|---|---|---|---|
| LA | 33.8 | 33.8 | 33.8 | 33.8 |
| Talc | 6.4 | 6.4 | 6.4 | 6.4 |
| TiO$_2$ | 6.4 | 6.4 | 6.4 | 6.4 |
| By | 16.9 | 16.9 | 16.9 | 16.9 |
| ZnB1 | 4.2 | NIL | NIL | NIL |
| ZnB2 | NIL | 4.6 | NIL | NIL |
| ZnB3 | NIL | NIL | 5.0 | NIL |
| ZnB4 | NIL | NIL | NIL | 5.3 |
| DAS | 1.7 | 1.7 | 1.7 | 1.7 |
| WS | 9.3 | 9.3 | 9.3 | 9.3 |

Notes to Table 7
(a) is as defined in Note to Table 1.
(b) ZnB1, ZnB2, ZnB3 and ZnB4 are, respectively, ZnHN (B1), ZnHN (B2), ZnHN (B3) and ZnHN (B4) as defined in Preparation of mixture of Zinc oxide and Zinc salt of 3-hydroxy-2-naphthoic acid.

The paints set out in Table 7 were coated onto steel panels and the coatings formed were tested as described in Examples 1 and 2 with the exception that an exposure time of 142 days was used. The results obtained are set out in Table 8 which also includes results with freshly prepared samples having the composition of Comp.A in Table 1 and Example 5 in Table 5.

TABLE 8

| Ex. or Comp. Ex. | Underfilm corrosion (b) (h) | | |
|---|---|---|---|
| | 3:1 | 1:1 | 1 |
| 5 | 2 (2.5) | 1 (2.5) | 1 (2) |
| 9 | 3 (2.5) | 2 (2) | 2 (1) |
| 10 | 4 (2.5) | 3 (2) | 3 (2) |
| 11 | 3 (3) | 4 (2.5) | 2 (2) |
| 12 | 4 (3) | 4 (3) | 3 (3) |
| A | | | 4 (3) |

Notes to Table 8
(b) is as defined in Notes to Table 2.
(h) is as defined in Notes to Table 6, with numbers in brackets indicating corrosion spot size as defined by the Champion reference.

EXAMPLE 13

Further paint compositions were prepared by the procedure of Examples 1 and 2. The compositions are set out in Table 8.

TABLE 9

| Component (a) (e) (k) | Ex. 13 (wt) | Comp. I (wt) | Comp. J (wt) | Comp. K (wt) |
|---|---|---|---|---|
| LA | 36.8 | 36.8 | 36.8 | 36.8 |
| Talc | 6.4 | 6.4 | 6.4 | 6.4 |
| TiO$_2$ | 6.4 | 6.4 | 6.4 | 6.4 |
| By | 16.8 | 16.8 | 16.8 | 16.8 |
| ZnP | 6.7 | 6.7 | 6.7 | 6.7 |
| ZnHN | 0.62 | NIL | NIL | NIL |
| ZnC | NIL | 1.01 | NIL | NIL |

TABLE 9-continued

| Component (a) (e) (k) | Ex. 13 (wt) | Comp. I (wt) | Comp. J (wt) | Comp. K (wt) |
|---|---|---|---|---|
| ZnIP | NIL | NIL | 1.01 | NIL |

Notes to Table 9
(a) is as defined in Note to Table 1.
(e) is as defined in Notes to Table 3.
(k) ZnIP is a proprietary basic zinc 5-nitroisophthalate containing 52% wt zinc.

The paints of Example 13 and Comparative Examples I and J were used either alone or as a mixture prepared by stirring with the paint of Comparative Example K.

The paints were coated onto steel panels and allowed to dry for 7 days. The panels were then exposed to salt spray conditions in accordance with ASTM B117 for 11 days, and monitoring blister formation in accordance with ASTM D610. The coating was stripped from the lower half of each plate and underfilm rust and rust creep from the scribe were assessed. The results are set out in Table 10.

TABLE 10

| Ex. or Comp. Ex. | Blister (l) (m) 3:1 | 1:1 | 1 | Underfilm Rust (e) (l) 3:1 | 1:1 | 1 | Rust Creep (c) (l) 3:1 | 1:1 | 1 |
|---|---|---|---|---|---|---|---|---|---|
| 13 | 2D | 6MD | 6MD | B | A | A | 1.1 | 0.7 | 1.2 |
| I | 3D | 3D | 2D | C | B | D | 1.9 | 0.8 | 1.2 |
| J | 3D | 4MD | 4MD | B | B | B | 1.0 | 2.1 | 0.5 |
| K | | | 3D | | | D | | | 1.3 |

Notes to Table 10
(c) and (e) are both as defined in Notes to Table 2.
(l) 3:1 indicates a mixture of three parts by weight of the paint of Comparative Example K to one part by weight of the paint of the Example or Comparative Example. 1:1 indicates a mixture of equal parts by weight of the paint of Comparative Example K and the paint of the Example or Comparative Example. 1 indicates the paint of the Example or Comparative Example was used alone.
(m) Blisters assessed in accordance with ASTM D610.

EXAMPLE 14

Emulsion paints were prepared having the compositions of Table 11. The paints were prepared by mixing together components 1 to 6 and slowly adding, in order, components 7 to 10 whilst stirring at 1000 r.p.m. using a 60 mm diameter cavitation stirrer.

Components 11 and 12 were then added, in turn, whilst continuing to stir, more slowly, at 600 r.p.m.

TABLE 11

| Component No. | Type (n) | Ex. 14 (wt) | Comp. L (wt) |
|---|---|---|---|
| 1 | Water | 14.2 | 12.7 |
| 2 | Antifoam | 0.7 | 0.6 |
| 3 | Surf | 3.5 | 3.1 |
| 4 | U. Thickener | 2.0 | 1.8 |
| 5 | C. Solv. | 6.0 | 5.3 |
| 6 | W. Agent | 1.0 | 1.1 |
| 7 | ZnHN | 23.8 | NIL |
| 8 | Talc | 21.9 | 15.6 |
| 9 | TiO₂ | 31.9 | 28.5 |
| 10 | By | 35.8 | 96.1 |
| 11 | L.E. | 218.5 | 195.1 |
| 12 | Water | 40.6 | 36.3 |

Notes to Table 11
(n) ZnHN, Talc, TiO and By are all as defined in Notes to Table 1. Antifoam is a blend of nonionic surfactants, finely dispersed solids and oils in a hydrocarbon carrier and available as Foamaster H2 from Henkel-Nopco Ltd. Surf was a 30% aqueous solution of ethoxylated (30) nonylphenol. U Thickener was a 35% w/w solution of an associative urethane thickener in propylene glycol/water and available as Acrysol RMS from Rohn and Haas. C. Solv. was 3-hydroxy-2,2,4-trimethylpentyl isobutyrate. W. Agent was a 25% solution in water of a sodium salt of a polyfunctional oligomer available as Polywet ND2 from Uniroyal. L.E. was a latex emulsion and was an air drying vinyl acrylic copolymer having a solids content of 55% and a chlorine content of 30% w/w (relative to solids content) available as Halofex 251 from ICI Chemicals & Polymers Group.

EXAMPLES 15 AND 16

The paints of Example 14 and Comparative Example L were mixed in the weight ratios 1:1 (Example 15) and 1:3 (Example 16).

The paints of Examples 14 to 16 and Comparative Example L were coated onto belt-abraded cold rolled steel test panels with a wire wound draw down bar to give a dry film thickness of 37±2 micrometers. After one day drying, the coated test panels were subjected to a corrosion treatment as described in Examples 1 and 2 with a test period of a total of three days. The lower half of each plate was stripped and underfilm corrosion was assessed. The results obtained are set out in Table 12.

TABLE 12

| Ex. or Comp. Ex. | Underfilm corrosion (h) Frequency |
|---|---|
| L | >7 |
| 14 | 6 |
| 15 | 7 |
| 16 | 6 |

Notes to Table 12
(h) is as defined in Notes to Table 6. All rust spot sizes were smaller than the "minute" size grade as defined in the Champion reference.

EXAMPLE 17

Paint having the compositions as set out in Table 13 were prepared by milling together the pigments, including the anti-corrosive pigments, extenders and a 25% w/w solution of chlorinated rubber in an aromatic hydrocarbon, this solution containing 32% of the total of chlorinated rubber. The milling was effected using a paint conditioner manufactured by the Red Devil Manufacturing Company (Model 5410) with 3 mm diameter glass beads, the glass beads being in an amount by weight of 2.5 times the weight of the other components. The resulting mill base was diluted with a solution of the remaining chlorinated rubber, aromatic hydrocarbon and chlorinated hydrocarbon.

TABLE 13

| Component (a) (f) (p) | Ex. 17 (wt) | Comp. M (wt) | Comp. N (wt) | Comp. O (wt) |
|---|---|---|---|---|
| RC | 13.4 | 13.4 | 13.4 | 13.4 |
| TiO₂ | 8.3 | 8.3 | 8.3 | 8.3 |
| Talc | 2.0 | 2.0 | 2.0 | 2.0 |
| By | 13.0 | 13.0 | 24.0 | 13.0 |
| ZnHN | 3.6 | NIL | NIL | NIL |
| Zn2N | NIL | 3.6 | NIL | NIL |
| ZnP | NIL | NIL | NIL | 7.0 |
| CH | 7.1 | 7.1 | 7.1 | 7.1 |
| AS | 30.4 | 30.4 | 30.4 | 30.4 |

Notes to Table 13
(a) is as defined in Note to Table 1.
(f) is as defined in Notes to Table 5.
(p) RC is a commercially available chlorinated rubber resin >64.5% chlorine, available as Alloprene R20 from ICI Chemicals & Polymers Group. CH is a commercially available chlorinated hydrocarbon containing 42% chlorine, available as Cereclor 42 from ICI Chemicals & Polymers Group. AS is an aromatic solvent with boiling range 168-200° C.

The paints of Example 17 and Comparative Examples M and O were used either alone or as a mixture prepared by mixing with the paint of Comparative Example N.

The paints were coated onto belt abraded cold rolled steel test panels with a draw down bar to give a dry film thickness of 25±2 micrometers. After nine days drying, the panels were subjected to a salt spray test in accordance with ASTM B117 for 21 days. The lower half of each plate was stripped. The panels were examined for underfilm corrosion. The results are set out in Table 14.

TABLE 14

| Ex. or | Underfilm corrosion (e) (q) (r) | | |
|---|---|---|---|
| Comp. Ex. | 3:1 | 1:1 | 1 |
| 17 | A | A | A* |
| M | A | B | B |
| N | | | A* |
| O | B | B | B |

Notes to Table 14
(e) is as defined in Notes to Table 2.
(q) 3:1 indicates a mixture of three parts by weight of the paint of Comparative Example N to one part by weight of the paint of the Example or Comparative Example. 1:1 indicates a mixture of equal parts by weight of the paint of Comparative Example N and the paint of the Example or Comparative Example. 1 indicates the paint of the Example or Comparative Example was used alone.
(r) *Although there was little corrosion and both of these are rated as A, the corrosion with the paint of Comparative Example N was worse than that with the paint of Example 17.

EXAMPLE 18

A paint was prepared in accordance with the composition of Example 5 with the exception that zinc 6-hydroxy-2-naphthoate was used in place of zinc 3-hydroxy-2-naphthoate.

A series of paints were prepared by mixing the paint of Example 18, or freshly prepared samples of materials having the compositions of Example 5 and Comparative Examples G and H of Table 5 with a freshly prepared material having the composition of Comparative Example A in Table 1. The paints were coated onto belt abraded cold rolled steel panels using a draw down bar to give a dry film thickness of 28±2 micrometers. The coatings were allowed to dry at ambient temperature for 7 days and then subjected to a salt spray test in accordance with ASTM B117 for 12 days. The lower half of each panel was stripped and the metal surface examined for corrosion. The results are set out in Table 15.

TABLE 15

| Ex. or | Underfilm corrosion (b) (e) | | |
|---|---|---|---|
| Comp. Ex. | 3:1 | 1:1 | 1 |
| 5 | A | A | A |
| A | | | D |
| G | D | D | D |
| H | B | B | B |
| 18 | D | B | B |

Notes to Table 15
(b) and (e) are both as defined in Notes to Table 2.

EXAMPLE 19

Samples of a clay grease were applied to bearings which were then subjected to the IP dynamic anti-rust test for lubricating greases (IP 220) using distilled water. The grease had been obtained by thickening a lubricating oil with 9% w.w of an organophilic clay and contained no corrosion inhibitor. The test was carried out using a grease to which 1% w/w of zinc 3-hydroxy-2-naphthoate had been added and also a grease to which there was no addition of a corrosion inhibitor.

On completion of the test after seven days, the bearings were removed, cleaned and the outer ring track carefully examined for rust or etch spots and rated in accordance with the standards of the test. The grease containing 1% zinc 3-hydroxy-2-naphthoate gave a rating of 0. The grease with no corrosion inhibitor gave a rating of 5.

PREPARATION OF ALUMINIUM SALT OF 3-HYDROXY-2-NAPHTHOIC ACID 3-hydroxy-2-naphthoic acid (27.3 g, 0.145M) was slurried with 50 cm$^3$ of water. 145 cm$^3$ of N sodium hydroxide solution was added to this slurry with stirring. The mixture was then heated on a steam bath to 65° C. and a dark orange brown solution was formed. A solution obtained by dissolving 14.1 g (0.048M) aluminium sulphate in 150 cm$^3$ of water was added, dropwise and with rapid stirring, over one hour. A yellow precipitate was formed during the addition. After completion of the addition, the mixture was stirred for one hour and then filtered. The yellow solid collected was washed several times with water and then dried in an oven at 50° C. to yield a yellow powdery solid (22.40 g).

By micro-analysis, the product was found to contain C 59.5% wt; H 4.0% wt; and Al 5.2% wt.

Theory for $C_{33}H_{21}O_9Al$ is C 67.3% wt; H 3.6% wt; and Al 4.6% wt.

EXAMPLE 20

A paint was prepared using the procedure of Example 5 except that the aluminium salt of 3-hydroxy-2-naphthoic acid was used in place of the zinc 3-hydroxy-2-naphthoate.

A series of paint compositions were prepared by mixing the resultant paint with a freshly prepared material having the composition of Comparative Example A. The paints were coated onto belt abraded cold rolled steel panels to give films with dry film thickness of 28±2 micrometers. The coatings were allowed to dry for 17 days and then exposed to ASTM B117 salt spray conditions for 10 days. The lower half of each panel was stripped and the metal surface examined for corrosion. The results are set out in Table 16.

TABLE 16

| Ex. or | Underfilm corrosion (b) (e) | | |
|---|---|---|---|
| Comp. Ex. | 3:1 | 1:1 | 1 |
| 20 | C | B | A |
| A | | | D |

Notes to Table 16
(b) and (e) are both as defined in Notes to Table 2.

We claim:
1. A corrosion inhibiting composition which comprises
   (a) a salt of a metal (M) of a hydroxycarboxylic acid in which the hydroxy group and the carboxylic acid group are attached to the ring atoms of a fused ring system and wherein the metal (M) is at least divalent; and
   (b) a surface coating compound or composition which is a film forming binder system, a natural oil, a natural grease or an oil or grease which is a petroleum refined product.
2. The composition of claim 1 wherein component (a) is other than zinc 2-hydroxynaphthoate.
3. The composition of claim 1 wherein the film forming binder system contains an alkyd containing resin, an epoxy resin, an oleoresin, a latex rubber, a chlorinated rubber, a vinyl resin, a polyurethane, a polyester, an organic silicate, a polyamide or an acrylic polymer.
4. The composition of claim 1 which contains a metal oxide and/or a metal phosphate wherein the metal which is present in the metal oxide and/or the metal phosphate is the same as the metal (M) which is present in the salt which is component (a).

5. The composition of claim 1 in which the salt is one in which the hydroxy group and the carboxylic acid group are attached to adjacent carbon atoms of the fused ring system.

6. The composition of claim 2 wherein the salt is barium or zinc 3-hydroxy-2-naphthoate.

7. A process for the inhibition of corrosion of metals which comprises applying the composition of claim 1 to at least part of a surface of the metal, the composition being applied such as to provide a corrosion inhibiting amount of component (a) to the at least part surface.

8. The process of claim 7 which comprises applying to the surface a composition wherein component (b) is an oil or a grease.

9. The process of claim 7 which comprises applying to the surface a composition wherein component (b) is a paint system which contains an alkyd-containing resin.

10. A metal article at least part of one surface of which has a coating of a surface coating compound or composition which is a film forming binder system, a natural oil a natural grease or an oil or grease which is a petroleum refined product and a salt of a metal (M) of a hydroxycarboxylic acid in which the hydroxy group and the carboxylic acid group are attached to the ring atoms of a fused ring system and wherein the metal (M) is at least divalent.

11. A corrosion inhibiting composition which comprises
    (a) a salt of a metal (M) of a hydroxycarboxylic acid in which the hydroxy group and the carboxylic acid group are attached to the ring atoms of a fused ring system and wherein the metal (M) is at least divalent; and
    (b) a surface coating compound or composition which is a film forming binder system which is a paint containing an organic polymer or which is a natural oil, a natural grease, or an oil or grease which is a petroleum refined product.

12. The composition of claim 11 wherein the surface coating compound or composition is a natural oil, a natural grease, or an oil or grease which is a petroleum refined product.

13. A metal article having improved resistance to corrosion and having on at least part of one surface thereof a corrosion inhibiting coating which is, or which contains, a salt of a metal (M) of a hydroxycarboxylic acid in which the hydroxy group and the carboxylic acid group are attached to the ring atoms of a fused ring system and wherein the metal (M) is at least divalent.

14. A metal article at least part of one surface of which has a coating of a surface coating compound or composition which is a film forming binder system, a natural oil, a natural grease, or an oil or grease which is a petroleum refined product and a blend of
    (a) a salt of a metal (M) of a hydroxycarboxylic acid in which the hydroxy group and the carboxylic acid group are attached to the ring atoms of a fused ring system and wherein the metal (M) is at least divalent; and
    (b) at least one of
        (i) a metal oxide; and
        (ii) a metal phosphate.

15. A corrosion inhibiting composition which is an aqueous emulsion or an aqueous suspension of a salt of a metal (M) of a hydroxycarboxylic acid in which the hydroxy group and the carboxylic acid group are attached to the ring atoms of a fused ring system and wherein the metal (M) is at least divalent.

16. The composition of claim 15 which includes a dispersant or a surfactant.

17. A process to improve the resistance of a metal to corrosion which comprises applying to at least part of a surface of the metal a corrosion inhibiting amount of the composition of claim 15.

18. A corrosion inhibiting blend of
    (a) a salt of a metal (M) of a hydroxycarboxylic acid in which the hydroxy group and the carboxylic acid group are attached to the ring atoms of a fused ring system and wherein the metal (M) is at least divalent; and
    (b) at least one of
        (i) a metal oxide; and
        (ii) a metal phosphate.

19. The blend of claim 18 which contains the zinc salt of the hydroxycarboxylic acid, zinc oxide and zinc phosphate.

* * * * *